United States Patent
Bonn

[19]

[11] Patent Number: 6,145,139
[45] Date of Patent: Nov. 14, 2000

[54] SUPPLEMENTARY WATER HEATER SYSTEM FOR SWIMMING POOLS AND SPA

[76] Inventor: Stephen P. Bonn, 1801 Port Stanhope Pl., Newport Beach, Calif. 92660

[21] Appl. No.: 09/221,499

[22] Filed: Dec. 28, 1998

Related U.S. Application Data

[60] Provisional application No. 60/073,280, Jan. 31, 1998.

[51] Int. Cl.[7] .................................................. F22D 1/02
[52] U.S. Cl. ........................ 4/493; 122/20 B; 122/421; 165/909
[58] Field of Search ................................ 4/493; 110/303; 392/479, 482, 490, 495, 496; 165/901, 909, 921; 126/350 R, 364, 365, 108; 122/20 B, 421; 237/8 R; 137/599.14, 599.15

[56] References Cited

U.S. PATENT DOCUMENTS

| | | | |
|---|---|---|---|
| 4,258,878 | 3/1981 | Van Pachtenbeke | 237/8 R |
| 4,448,136 | 5/1984 | White | 122/17 |
| 4,502,626 | 3/1985 | Gerstmann et al. | 236/20 R |
| 5,165,596 | 11/1992 | Le Mer | 237/8 R |
| 5,345,996 | 9/1994 | Druien | 165/47 |
| 5,606,964 | 3/1997 | Bussman | 126/350 R |

*Primary Examiner*—Charles R. Eloshway
*Assistant Examiner*—Peter deVore

[57] ABSTRACT

An improved swimming pool/spa water heating system whereby a portion of the water flow into the main heater unit (3), is preheated, thereby decreasing the time of operation of the main heater unit (3), to raise the pool water temperature to the desired temperature. The system improvement includes an arrangement wherein pool water is drawn from the pool by the water pump (22), and a portion of the water is diverted through a supplementary heater unit (27), which is located in the combustion exhaust stream of the main heating unit (3). The diverted water is thus preheated in the supplementary heater unit (27), by the residual heat in the main heater unit exhaust and is then directed back into the water system, at a point prior to the inlet of the main heater unit (3), and mixes with the remaining water in the system, thereby increasing the temperature of water into the main heater unit (3).

2 Claims, 2 Drawing Sheets

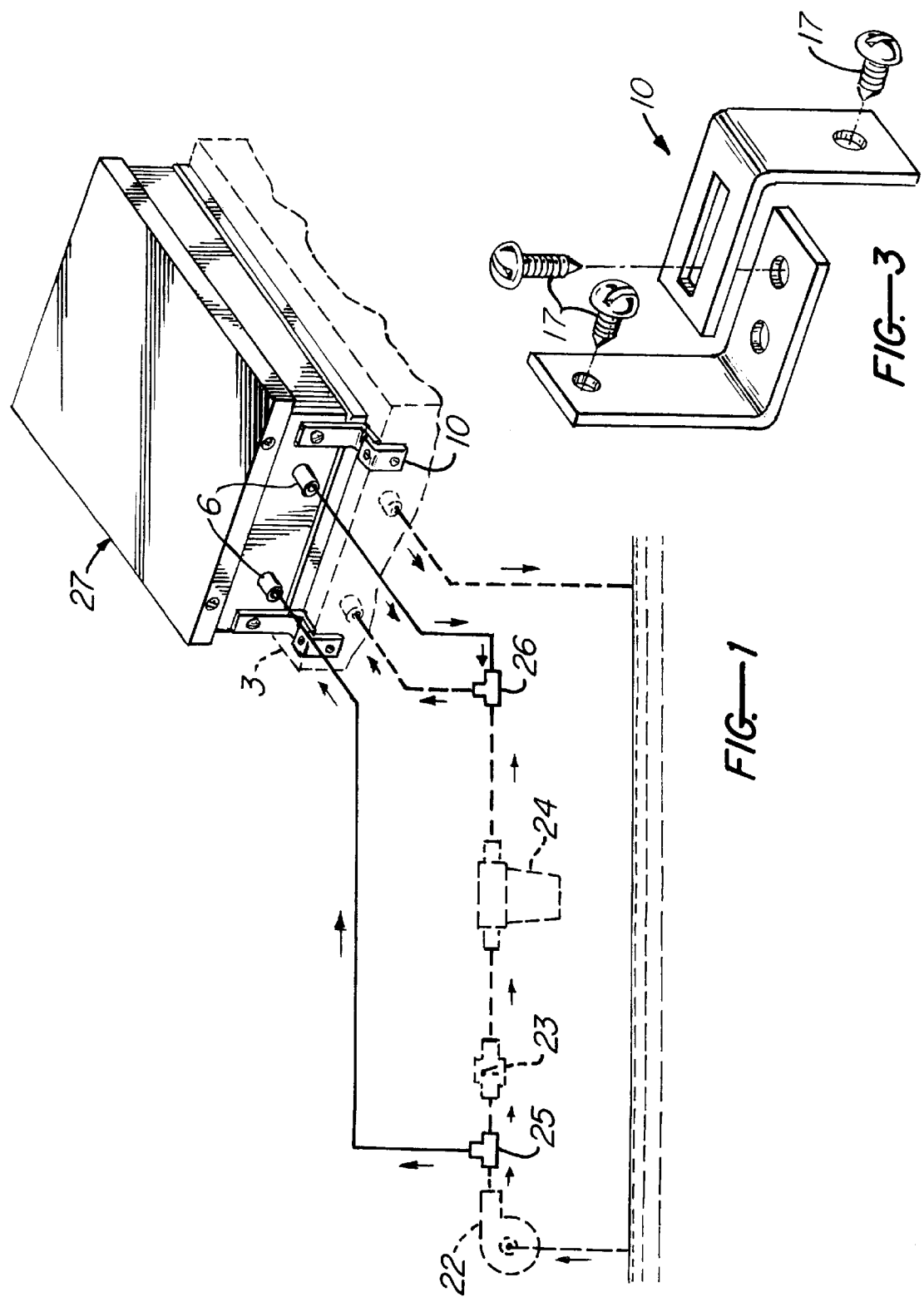

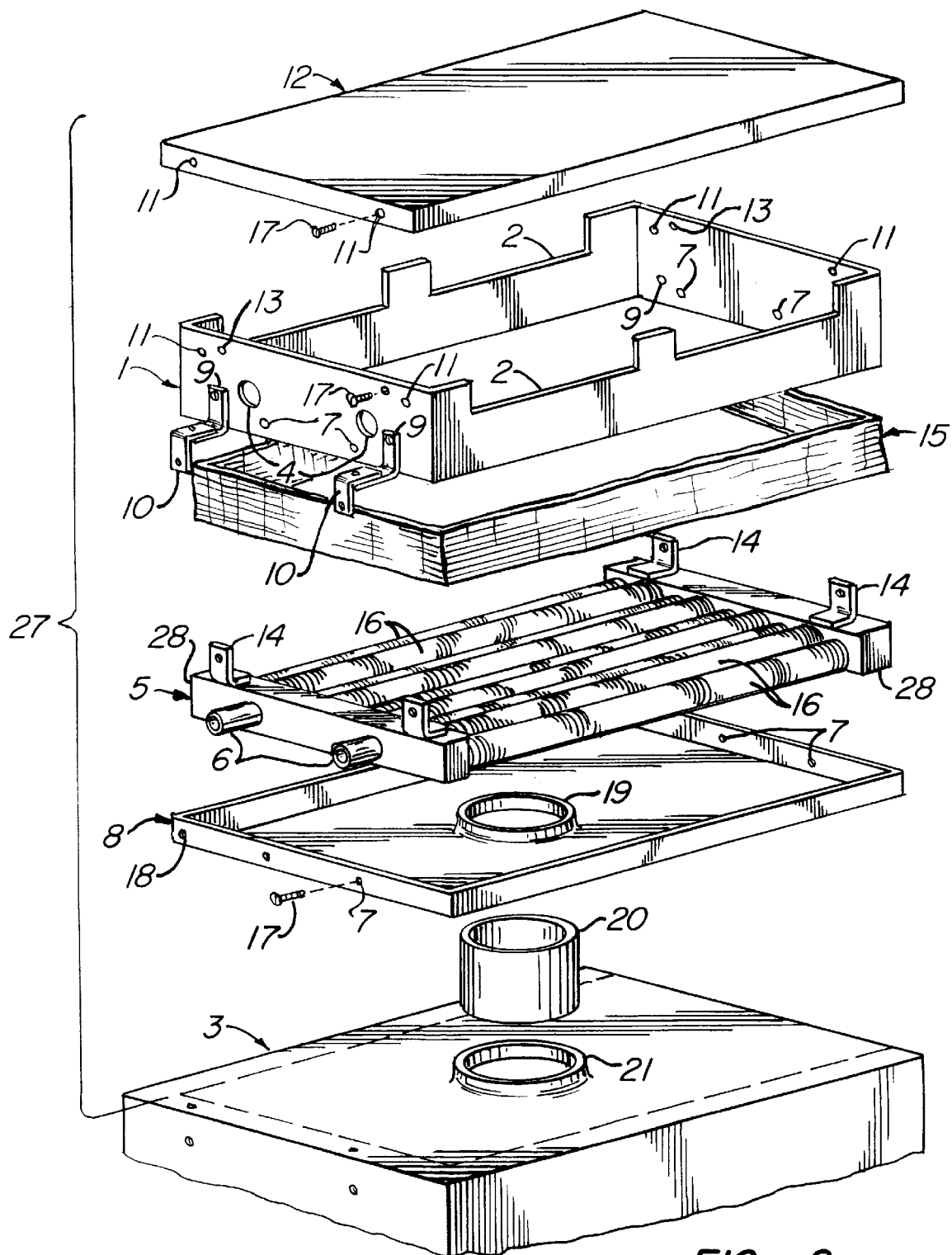
FIG.—2

SUPPLEMENTARY WATER HEATER SYSTEM FOR SWIMMING POOLS AND SPA

REFERENCE TO RELATED APPLICATIONS

Provisional Patent Application—Supplementary Water Heater For Swimming Pools or Saunas. Inventor—Stephen P. Bonn. Application Number 60/073,280. Filing Date—Jan. 31, 1998.

BACKGROUND

1. Field of Invention

This invention is a supplementary water heater system for use in swimming pool or spa installations where the water is heated by the exhaust combustion products of the gas fired main heater.

2. Description of Prior Art

To heat the water in a swimming pool or spa installation, the methods generally used in the industry consist of a gas fired main heater unit with various types of commercially available heat exchangers. Swimming pool heater manufacturers are continuously striving to improve the efficiency of heat transfer of the combustion heat into the circulating swimming pool or spa water. There, nevertheless, is a significant quantity of heat remaining in the combustion exhaust of the main heater unit. Therefore, they are not solving the problem of utilizing this remaining heat in the exhaust. This residual heat is wasted heat, being exhausted into the atmosphere.

Examples of U.S. patents which have been awarded, which are intended to improve the heating efficiency of swimming pools are as follows: U.S. Pat. No. 5,415,221 (1995), U.S. Pat. No. 5,178,523 (1993), U.S. Pat. No. 5,184,472 (1993), U.S. Pat. No. 5,199,116(1993), U.S. Pat. No. 5,205,133 (1993) U.S. Pat. No. 5,208,923 (1993). Not any of these patents addresses the problem of utilizing the remaining heat in the exhaust of the main heater .This heat is wasted heat, being exhausted into the atmosphere.

There are several undesirable consequences which are the result of wasting this residual heat, some of which are as follows:

(a) Increased fuel gas consumption—Because some of the heat is being wasted, the main heater must operate for a longer period of time than it would have, in order for the water to reach it's desired temperature.

(b) Increased electrical power consumption.—It is necessary for the system electrical equipment, primarily the water pump, to be in operation while the main heater is in operation, in order to circulate the water.

(c) Increased utility costs.—The aforementioned increased consumption of fuel gas and electrical power is resulting in increased operating costs.

(d) Increased air pollution—The increased fuel consumption requirement, as stated above, is causing an increase in air pollution by the combustion exhaust products.

(e) When considering the number of swimming pool and spa heaters, on a national scale, which are presently in existence and which will be installed in the future, the said additional utilities consumption is contributing a significant amount of pollutants into the atmosphere.

(f) When considering the number of swimming pool and spa heaters, on a national scale, which are presently in existence and which will be installed in the future, the said additional utilities consumption is requiring additional utilities generating capacity, with the required additional capitalization for the utilities companies.

(g) In heater installations where it is desired to increase the heating capacity of the heater, it is necessary to replace the existing heater at a significant cost.

OBJECTS AND ADVANTAGES

Accordingly, several objects and advantages of the present invention are to provide supplementary heater that will:

(a) utilize the residual exhaust heat.

(b) achieve the desired water temperature sooner.

(c) reduce fuel gas consumption.

(d) reduce electrical power consumption.

(e) reduce operating utility costs.

(f) reduce air pollution from combustion exhaust products.

(g) increase system heating potential with no increase in utilities consumption.

(h) easily provide system increased heating capacity, due to relatively light weight, inexpensive and easily installed, as compared to installing a new main heater unit.

Further objects and advantages are to supplement the heating potential of the main heater unit by preheating the water supply to the main heater unit. This is accomplished by providing a light weight supplementary heater unit, that could be easily installed in the path of the main heater combustion exhaust and thereby make use of the heat energy in the exhaust, at no additional cost to the consumer. Thereby achieving the desired water temperature sooner, thereby using less utilities and paying less utilities cost and reducing the air pollutants in the exhaust, because of the shorter operating time to reach the desired water temperature. Positioning of the supplementary heater unit above the main heater unit can be by mounting said supplemenatry heater unit directly onto the main heater unit or fastened above the main heater unit by mechanical means. Still further objects and advantages will become apparent from a consideration of the ensuing description and drawings.

SUMMARY, RAMIFICATIONS, AND SCOPE

Accordingly, the reader will see that the supplementary heater unit presented in this invention, will decrease the time to raise the pool water temperature to the desired temperature. This will be accomplished because the supplementary heater unit utilizes the residual heat in the exhaust of the main heater unit to preheat the water supply to the main heater unit. Therefore it will decrease the required time for the swimming pool or spa water to reach the desired temperature. Furthermore, it has the additional advantages in that it will reduce the utilities consumption, because of the shortened time of operation that would otherwise be required, it will decrease the cost for gas and utilities because of the reduced usage.

it will support national energy conservation efforts.

it will decrease air pollution because of the reduced gas usage.

it will support world wide air pollution reduction efforts.

it will decrease utilities distribution equipment and costs, by utilities companies, because of reduced utilities demand.

Although the descriptions, herein, contain many specificities, these should not be construed as limiting the scope of the invention, but as merely providing illustrations of some of the presently preferred embodiments of this invention. For example the dimensions of the supplementary heater will depend on the dimensions of the main heater; the methods of attaching the various components may be by various mechanical means including brackets, screws, bolts, brazing, etc; the supplementary heater can be installed anywhere in the main heater exhaust stream; the method of connecting the water supply source to the supplementary heater may be by: saddle-tee connectors, T couplings of various materials, brazing, etc; the supplementary heater assembly components may be of a variety of materials including sheet metal, aluminum, plastic, etc; said components could include, or not include, all elements, such as condensate pan or exhaust duct, etc; the supplementary heater unit tubing assembly may have manifolds or not; said tubing may be of a variety of configurations such as finned tubing, single continuous tube, multilayer tubing, interior ridged surface, etc; the supplementary heater unit water supply may be the entire flow in the water pump discharge rather than a diverted portion.

Thus the scope of the invention should be determined by the appended claims and their legal equivalents, rather than by the examples given.

DRAWINGS FIGURES

FIG. 1 shows a typical water flow system diagram depicting the positioning of the supplementary water heater unit and points of connection.

FIG. 2 shows an exploded view of the supplementary water heater unit with all major components.

FIG. 3 shows a detail of the supplementary heater tie-down brackets.

REFERENCE NUMERALS IN DRAWINGS

| | |
|---|---|
| 1 | enclosure sides |
| 2 | exhaust vent |
| 3 | main heater unit |
| 4 | heat exchanger tube hole |
| 5 | heat exchanger assembly |
| 6 | heat exchanger tube connection |
| 7 | condensate pan attachment hole |
| 8 | condensate pan |
| 9 | tie-down bracket attachment holes |
| 10 | tie-down bracket |
| 11 | cover attachment hole |
| 12 | cover |
| 13 | heat exchanger attach bracket hole |
| 14 | attachment bracket |
| 15 | blanket insulation |
| 16 | finned tubing |
| 17 | screw |
| 18 | drain hole |
| 19 | pan exhaust duct opening |
| 20 | exhaust duct |
| 21 | main heater exhaust opening |
| 22 | water pump |
| 23 | backwash valve |
| 24 | water filter |
| 25 | supply "saddle-tee" fitting |
| 26 | effluent "saddle-tee" fitting |
| 27 | supplementary heater unit |
| 28 | manifold |

DESCRIPTION OF DRAWINGS—FIGS. 1, 2, 3

A typical representation of the present invention relative to the supplementary heater unit water supply connection and the discharge of the preheated water from the supplementary heater unit is illustrated in FIG. 1. Water is drawn from the swimming pool or spa by a water pump 22. A predetermined portion of the water is diverted to the supplementary heater unit 27. The water discharge from the supplementary heater unit 27 is connected to the water supply piping of the main heater unit 3. The water discharge from the main heater unit 3 is the returned to the swimming pool or spa. In the preferred embodiment of this invention the components and configuration of the supplementary heater unit 27 is illustrated in FIG. 2. The supplementary heater unit 27 consists of an enclosed heat exchanger assembly 5. The enclosure has a cover 12 and a bottom condensate pan 8. The combustion exhaust from the main heater unit 3 is directed into the supplementary heater unit 27 through the exhaust duct 20 and vented through the openings in the enclosure sides 1.

(a) Material—The supplementary heater 27, enclosure can be fabricated of any suitable rigid material when considering weight, strength, resistance to high temperature, ease of fabrication, etc (b) Exhaust duct 20—The exhaust duct is positioned on the main heater 3, directly over the main heater exhaust opening 21, and inserted into the condensate pan exhaust duct opening 19. In this manner it directs the main heater combustion exhaust into the supplementary heater enclosure (c) Condensate pan 8—Said pan is fastened to the bottom of the enclosure sides 1, by means of screws 17, or any mechanical or other means. It serves as the bottom side of the supplementary heater unit 27 to help confine the heat within the supplementary heater 27 and also to contain the heat exchanger 5 condensate. An exhaust duct opening 19, is provided in said pan to allow insertion of the exhaust duct 20. This opening has a raised edge perimeter to prevent condensate from draining into the main heater 3, through the exhaust duct 20. The condensate pan 8, is fabricated with a slope towards one point FIG. 2, in order to allow the condensate, which may form on the heat exchanger tubing 16, to drain to that point, where a drain hole 18, is provided. A drain tube may be attached to the drain hole to direct the draining condensate (d) Heat exchanger assembly 5—There are several varieties of commercially available air-to-water heat exchangers. One type which is depicted in FIG. 2, consists of two manifolds 28 connected by finned tubing. Another configuration is continuous tubing without manifolds. Still another is multilayer tubing. There are a variety of tubing types commercially available, designed with different interior and exterior surface treatments to collect heat, which can be used.

The heat exchanger assembly 5, is firmly fastened to the supplementary heater enclosure sides 1. One method, as illustrated in FIG. 2, is by means of adjustable attachment brackets 14. Other attachment methods may be used depending on the configuration and dimensions of the heat exchanger unit 5.

(e) Insulation 15—The purpose of the insulation is to reduce heat transfer loss through the supplementary heater enclosure sides 1, and cover 12. It is installed on the inside surfaces and can be attached with adhesives or other mechanical means.

(f) Enclosure sides 1—This component contains exhaust vents 2, for venting the main heater unit combustion exhaust, heat exchanger tube holes 4, heat exchanger attachment bracket holes 13, condensate pan attachment holes 7, tie-down bracket attachment holes 9, and cover attachment holes 11. The tie-down brackets 10, fasten the supplementary heater assembly to the main heater unit 3, to prevent movement.

(g) Cover 12—The cover is fastened to the enclosure sides 1, by screws, as one method of attachment. The inside surface is lined with insulation 15. The cover is larger than the enclosure sides 1, and overlaps the enclosure sides on the sides having exhaust vents to allow the main heated exhaust to escape .The cover also serves as weather protection.

A representation of the preferred embodiment of an adjustible tie—down bracket is illustrated in FIG. 3. After the upper half is fastened to the supplementary heater unit 27 by means of screws, and as illustrated in FIG. 1 and 2, the lower half is fastened to the upper half and the main heater unit by means of screws.

Operation—FIG. 1

Water is drawn from the swimming pool or spa by a water pump 22. A predetermined portion of the water is diverted from the main water system, at a connection point after the pump, prior to encountering any other water system control or processing elements in the piping system. The connection point is located as described in order to avoid pressure drop in the elements and maintain the highest available pressure in the diverted water system without the need of an additional water pump in the system. This connection can be made using a saddle tee fitting 25. The diverted flow is directed through a supplementary heater unit 27, which is located in the combustion exhaust stream of the main heating unit 3. The combustion exhaust contains residual heat. The diverted water is heated in the supplementary heater unit 27 by the residual heat in the main heater unit combustion exhaust. The diverted water is then directed back into the main water system, at a point prior to the inlet of the main heater unit 3. This connection can also be made with a saddle tee fitting 26. The heated diverted water mixes with and therefor preheats the water in the main water system increasing the temperature. of the water flowing into the main heater unit 3. Whereby preheating the water into the main heater unit 3, decreasing the required time of the main heater unit 3, to raise the swimming pool or spa water temperature to the desired temperature.

I claimed:

1. In a water filtering and heating system for swimming pools and the like, characterised by a water pump adapted to be connected to receive water from said pool, a filter assembly connected to receive the water conveyed from said pump, and a primary heater assembly including a combustion chamber for confining the combustion of fuel, an exhaust formed above said combustion chamber for conveying the products of said combustion to the exterior, a primary heat exchanger mounted in said combustion chamber subjacent said exhaust adapted to be connected to receive said water conveyed from said filter and to return said water to said pool, the improvement comprising:

a secondary heat exchanger connected to receive a part of said water conveyed from said pump and to convey said received part of said water in parallel with said filter assembly to combine with said water conveyed to said primary heat exchanger; and a mounting assembly conformed to enclose and mount said secondary heat exchanger in said exhaust, said mounting assembly including a lower pan communicating with said exhaust and conformed to support said secondary heat exchanger and a cover over said secondary heat exchanger, said lower pan and said cover being mounted over said combustion chamber in a spaced relationship relative said secondary heat exchanger to convey said products of combustion thereacross, said lower pan further defining a bounded volume for collecting the condensates of said products of combustion produced in the course of the heat exchange with said secondary heat exchanger.

2. Apparatus according to claim 1, wherein:

said secondary heat exchanger comprises a plurality of finned tubes received between said pan and said cover.

* * * * *